United States Patent Office 3,106,575
Patented Oct. 8, 1963

---

3,106,575
NITRATE COMPOUNDS
John F. Herber, Clayton, Mo., assignor to Monsanto Chemical Company, St. Louis, Mo., a corporation of Delaware
No Drawing. Filed Oct. 20, 1961, Ser. No. 146,429
6 Claims. (Cl. 260—466)

This invention relates to a new class of chemical compounds, and more particularly to novel cycloaliphatic nitrates and to a method of preparing them. Specifically, the invention relates to novel nitrosocycloaliphatic nitrate dimers represented by the structural formula

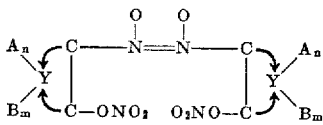

wherein Y is an alkylene radical having from 3 to 6 carbon atoms inclusive; A is an alkyl group having from 1 to 3 carbon atoms inclusive; B is a halogen; and $n$ and $m$ are cardinal numbers from 0 to 6, inclusive. It will be apparent that Y can also be defined as the residue of a cycloaliphatic or alicyclic nucleus.

This invention is concerned with a new class of compounds having utility as intermediates in organic synthesis, particularly in the preparation of polycarboxylic acids.

It is a primary object of this invention to provide new and novel nitrosocycloaliphatic nitrate dimers. Another object of this invention is to provide a new and useful method for the preparation of such dimers of nitroso cycloaliphatic nitrates. A further object is to provide a new and novel class of nitrosocycloaliphatic nitrate dimers which serve as intermediates in the preparation of polycarboxylic acids.

These and other objects of this invention will become apparent to those skilled in the art upon consideration of the following detailed description and specific embodiments thereof.

It has been found that nitrosocycloaliphatic nitrate dimers of the general formula

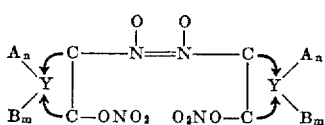

can be prepared by oxidizing, with nitrogen tetroxide ($N_2O_4$) and nitric acid, an unsaturated cyclic compound of the general formula:

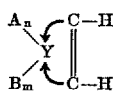

In these formulae, A, B, Y, $m$ and $n$ have the previously designated meanings. Illustrative of the cyclic compounds which may be oxidized by this process are cyclopentene; cyclohexene; cycloheptene; cyclooctene; methyl cyclopentenes, ethyl cyclopentenes, propyl cyclopentenes, methyl cyclohexenes, ethyl cyclohexenes, propyl cyclohexenes, methyl cycloheptenes, ethyl cycloheptenes, propyl cycloheptenes, methyl cyclooctenes, ethyl cyclooctenes, propyl cyclooctenes, chlorocyclopentenes, bromocyclopentenes, fluorocyclopentenes, iodocyclopentenes, chlorocyclohexenes, bromocyclohexenes, fluorocyclohexenes, iodocyclohexenes, chlorocycloheptenes, bromocycloheptenes, fluorocycloheptenes, iodocycloheptenes, chlorocyclooctenes, bromocyclooctenes, fluorocyclooctenes, iodocyclooctenes and the like. It will also be readily appreciated that various other starting cyclo ompounds having one or more alkyl substitutents and/or one or more halogen substituents can also be used in accordance with the present invention.

In general, the nitric acid employed in this process can have a concentration range of from about 40 to about 100%. Preferably, however, nitric acid concentrations in the range of from about 50 to about 75% are used. The amount of nitric acid employed is not particularly critical. It is only necessary that it is present in sufficient quantities to insure solution or uniform distribution of the cyclic compound. Thus in most instances, weight ratios of nitric acid to the cyclic compound of from 2:1 to about 4:1 are satisfactory. The molar ratio of nitrogen tetroxide to the starting cyclic compound can vary from as low as about 0.25:1 to as high as about 1:1. A mole ratio of nitrogen tetroxide to oxidized compound in the range of from about 0.6:1 is preferred.

The reaction readily can be executed throughout the approximate temperature range from −25° C. to 25° C. However, a temperature range of about 0° C. to about 8° C. is preferable.

The invention will be more fully understood by reference to the following illustrative examples which describe the detailed preparation of representative compounds. It will be understood that these examples are given for the purpose of illustration only, and are not to be construed as limiting the scope of this invention in any way. In these embodiments and throughout the application, all proportions are expressed in parts by weight unless otherwise indicated.

EXAMPLE I

*Dimer of 2-Nitrato-1-Nitrosocyclohexane*

About 100 ml. of 70% nitric acid were introduced into a suitable reaction vessel, and cooled to a temperature of about 0° C. When this temperature was attained about 33 grams of cyclohexene and about 35 grams of nitrogen dioxide were added. With the addition of these reactants the reaction mixture assumed a greenish color. The mixture was agitated during the addition and the agitation continued throughout the remainder of the process. The reaction mixture was maintained at a temperature of about 0° C. for about an hour. Then approximately 150 ml. of water were added at such a rate to maintain the temperature below about 5° C. After all of the water had been added, the mixture was allowed to warm to room temperature and stirred for a period of about 16 hours. During this latter period a white crystalline precipitate of the dimer formed which was removed by filtration. This material after recrystallization from acetic acid had a melting point of 148–149° C. Its infrared analysis exhibited strong nitrate bands at 6.1 and 7.38μ.

*Anal.*—Calculated for $(C_6H_{10}N_2O_4)_2$: C, 41.38; H, 5.79; N, 16.10. Found: C, 41.41; H, 5.94; N, 16.10.

EXAMPLE II

*Dimer of 2-Nitrato-1-Nitrosocyclooctane*

The process of Example I was substantially repeated using 44.5 grams of cyclooctene rather than 33 grams of cyclohexene. The identity and proportions of the other reactants and the reaction conditions were substantially identical to those described in accordance with the above example. The white crystalline nitroso nitrate dimer of cyclooctane thus obtained had a melting point of 164–165° C.

EXAMPLE III

*Nitroso Nitrate Dimer of 4-Methylcyclohexane*

In like manner the nitroso nitrate dimer of 4-methylcyclohexane was prepared. Again the proportions of reactants with the exception of the cyclic compound were maintained. In this example about 39 grams of 4-methylcyclohexene were introduced into the reaction vessel in place of the cyclohexene and cyclooctene of the above examples. The white crystalline nitroso nitrate dimer of 4-methylcyclohexane was readily recovered from the mixture by filtration after completion of the reaction.

The dimers of the present invention can be readily converted to additional valuable products. These nitrosocycloaliphatic nitrate dimers have been found to be readily oxidizable to polybasic acids in high yields. An improved process is thereby provided for the production of such polybasic acids, namely, (1) converting the cycloalkenes to dimers of nitrosocycloaliphatic nitrates, and (2) oxidizing the dimers to the corresponding polybasic acids. The present invention thus provides a simple process for the preparation of glutaric acid, adipic acid, pimelic acid, and suberic acid from cyclopentene, cyclohexene, cycloheptene and cyclooctene, respectively. Detailed preparations of such polycarboxylic acids from nitrosocycloaliphatic nitrate compounds are illustrated by the following examples.

EXAMPLE IV

*Adipic Acid From Dimer of 2-Nitrato-1-Nitrosocyclohexane*

A mixture of about 20 ml. of about 70% nitric acid and about 0.05 gram of ammonium vanadate was introduced into a suitable reaction vessel provided with an agitator, condenser and temperature indicating means. This mixture was heated to a temperature of approximately 60° C. Then approximately 2.85 grams of 2-nitrato-1-nitrosocyclohexane obtained from the process of Example I were introduced to the acid mixture in small increments at such a rate that the temperature was kept between 60–65° C. After all of the 2-nitrato-1-nitrosocyclohexane had been added the agitation was continued for about 3 hours while the temperature was maintained at about 60° C. The reaction mixture was then permitted to return gradually to room temperature over a period of about 16 hours. At the end of this time the mixture was chilled in an ice bath to about 0° C. and white adipic acid precipitated therefrom. The acid was separated by filtration and dried. Approximately 2 grams of adipic acid representing a yield of approximately 84% was obtained. This product had a melting point of 146–148° C. prior to further purification.

EXAMPLE V

*Suberic Acid From the Nitroso Nitrate Dimer of Cyclooctane*

The process of Example IV was substantially repeated in the preparation of suberic acid. The only substantial difference in these two preparations was the utilization of 2.5 grams of the nitroso nitrate dimer of cyclooctane obtained from the process of Example II instead of the cyclohexene derivative as a starting material. The resultant suberic acid was obtained in high yield and after precipitation and filtration had a melting point of 139–141° C. prior to any additional purification.

EXAMPLE VI

*Beta-Methyl Adipic Acid From the Nitroso Nitrate Dimer of 4-Methyl Cyclohexane*

In like manner beta-methyl adipic acid is readily synthesized in a manner substantially identical to those described above. While the same reactants and conditions are employed, approximately 2.5 grams of the nitroso nitrate dimer of 4-methyl cyclohexane obtained from the process of Example III are used as a starting material. The beta-methyl adipic acid thus obtained had a melting point of 92–95° C.

Similarly cyclopentenes and cycloheptenes can be oxidized with nitric acid and nitrogen dioxide to form the corresponding nitroso nitrate dimers. These dimers are also readily oxidizable to form glutaric and pimelic acids respectively.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A nitroso cycloaliphatic nitrate dimer having the structural formula

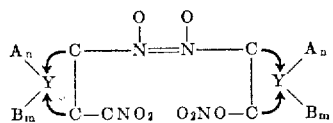

wherein Y is an alkylene radical having from 3 to 6 carbon atoms inclusive; A is an alkyl group having from 1 to 3 carbon atoms inclusive; B is a halogen; and $m$ and $n$ are cardinal numbers from 0 to 6 inclusive.

2. A dimer of 2-nitrato-1-nitroso-cyclohexane.
3. A dimer of 2-nitrato-1-nitroso-cyclopentane.
4. A dimer of 2-nitrato-1-nitroso-cycloheptane.
5. A dimer of 2-nitro-1-nitroso-cyclooctane.
6. A method of preparing nitroso cycloaliphatic nitrate dimers having the structural formula

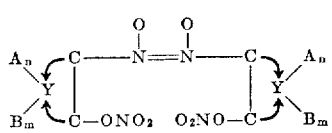

which comprises oxidizing with nitrogen tetroxide and nitric acid an unsaturated cyclic compound of the structural formula

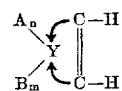

wherein Y is an alkylene radical having from 3 to 6 carbon atoms inclusive; A is an alkyl group having from 1 to 3 carbon atoms inclusive; B is a halogen; and $m$ and $n$ are cardinal numbers from 0 to 6 inclusive.

References Cited in the file of this patent

Stevens et al.: J. Am. Chem. Soc. 79 pp. 600, 8–14 (1957).

Baldock et al.: J. Chem. Soc. (1949), p. 2627.

UNITED STATES PATENT OFFICE
CERTIFICATE OF CORRECTION

Patent No. 3,106,575                        October 8, 1963

John F. Herber

It is hereby certified that error appears in the above numbered patent requiring correction and that the said Letters Patent should read as corrected below.

Column 4, lines 25 to 30, for that portion of the structural formula reading "-$CNO_2$" read -- -$ONO_2$ --; line 38, for "nitro" read -- nitrato --.

Signed and sealed this 14th day of April 1964.

(SEAL)
Attest:

ERNEST W. SWIDER

Attesting Officer

EDWARD J. BRENNER

Commissioner of Patents